(12) United States Patent  (10) Patent No.: US 7,392,894 B2
Jacob et al.  (45) Date of Patent: Jul. 1, 2008

(54) ADJUSTABLE LANE ASSEMBLY

(75) Inventors: Jeffrey G. Jacob, Buford, GA (US);
Rafe T. Patterson, Newnan, GA (US);
Michael F. Flagg, Newnan, GA (US);
John W. Cash, III, Dallas, GA (US)

(73) Assignee: MeadWestvaco Packaging Systems, LLC, Glen Allen, VA (US)

( * ) Notice: Subject to any disclaimer, the term of this patent is extended or adjusted under 35 U.S.C. 154(b) by 0 days.

(21) Appl. No.: 11/742,171

(22) Filed: Apr. 30, 2007

(65) Prior Publication Data

US 2008/0041697 A1 Feb. 21, 2008

Related U.S. Application Data

(60) Provisional application No. 60/745,996, filed on Apr. 28, 2006.

(51) Int. Cl.
*B65G 47/26* (2006.01)
(52) U.S. Cl. .................. 198/419.3; 198/453; 53/534
(58) Field of Classification Search ............. 198/419.3, 198/443, 452, 453, 457.05, 836.3; 53/448, 53/534
See application file for complete search history.

(56) References Cited

U.S. PATENT DOCUMENTS

| 2,422,726 | A | | 6/1947 | Goldacker |
| 3,767,027 | A | * | 10/1973 | Pund et al. .................. 198/452 |
| 3,778,959 | A | * | 12/1973 | Langen et al. ................ 53/534 |
| 4,470,499 | A | | 9/1984 | Sijbrandij |
| 4,623,059 | A | | 11/1986 | Agnew |
| 5,546,734 | A | | 8/1996 | Moncrief |
| 5,606,848 | A | | 3/1997 | Domino et al. |
| 5,697,201 | A | | 12/1997 | Domino et al. |
| 5,706,633 | A | * | 1/1998 | Moncrief et al. .............. 53/448 |
| 5,775,067 | A | * | 7/1998 | Hawley ................... 198/419.3 |
| 5,937,995 | A | | 8/1999 | Hartness |
| 6,516,938 | B1 | | 2/2003 | Paselsky |

* cited by examiner

*Primary Examiner*—James R Bidwell
(74) *Attorney, Agent, or Firm*—Karen L. Ware

(57) ABSTRACT

A packaging machine (10) includes a lane assembly (12) that includes one or more lanes (L) which guide cylindrical articles (B), such as cans or bottles, across a series of substantially parallel conveyors. The lane assembly (12) includes an adjustable guide bar (34) which defines an adjustable portion (V) of the lane (L) that can be adjusted to adapt to the diameter of articles (B). The lane assembly (12) also includes lane extensions (70) that can be adjusted to control the position of rows of articles (B) as the articles (B) exit the lanes (L) onto a conveyor (20).

9 Claims, 10 Drawing Sheets

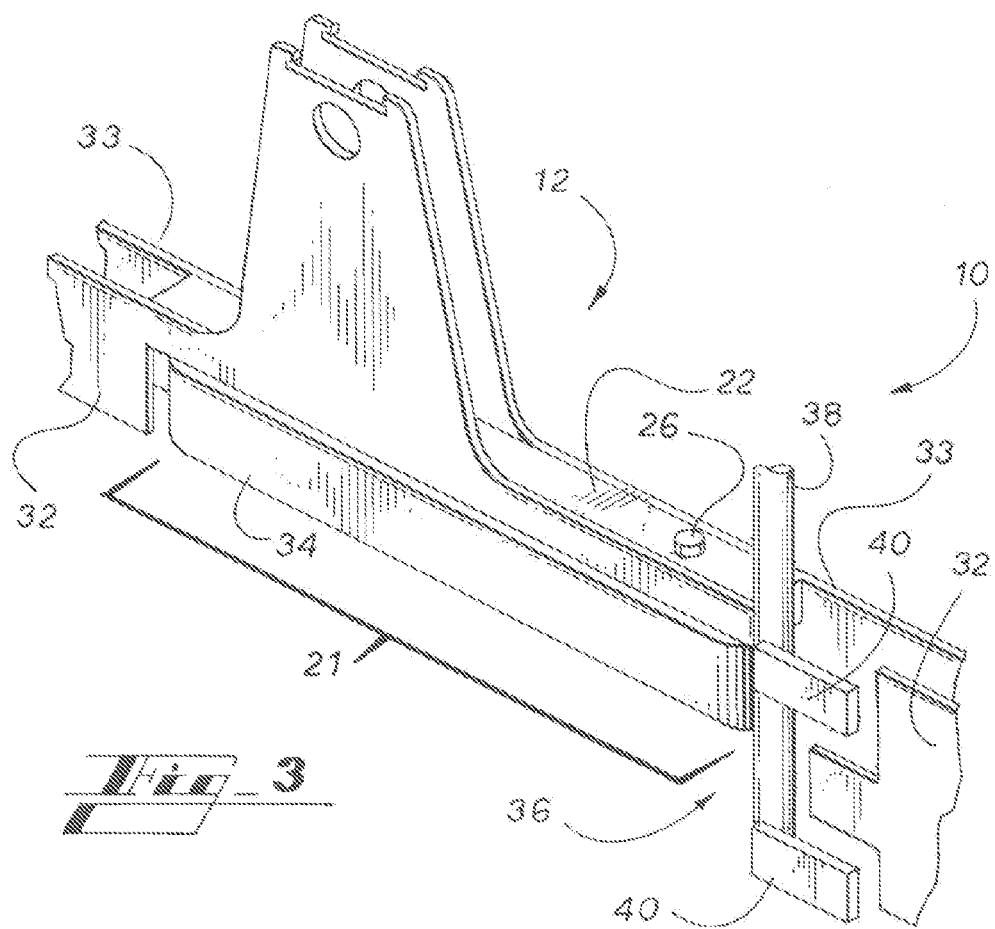
Fig_3
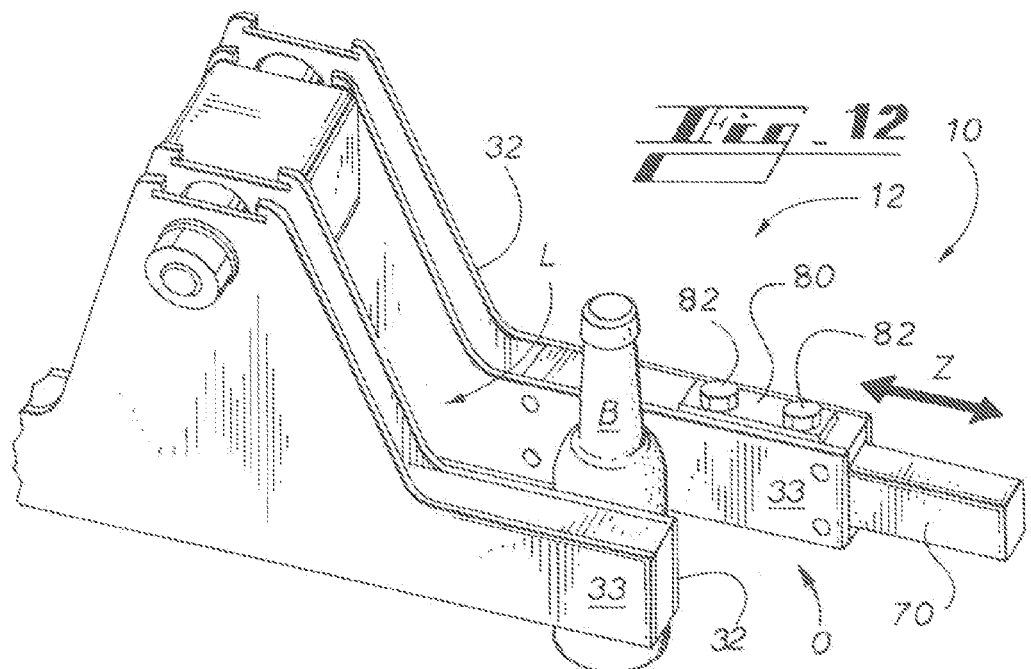
Fig_12

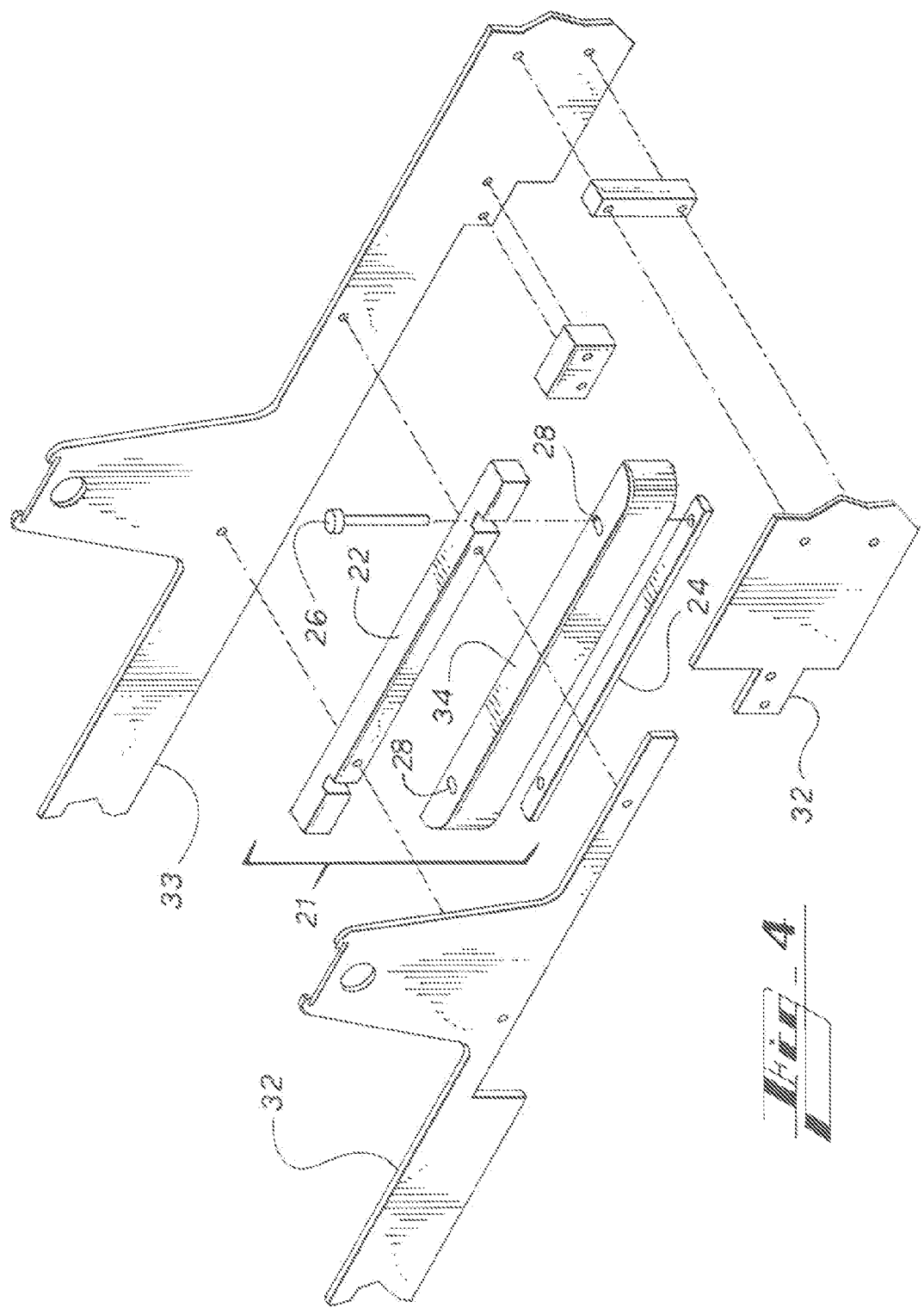

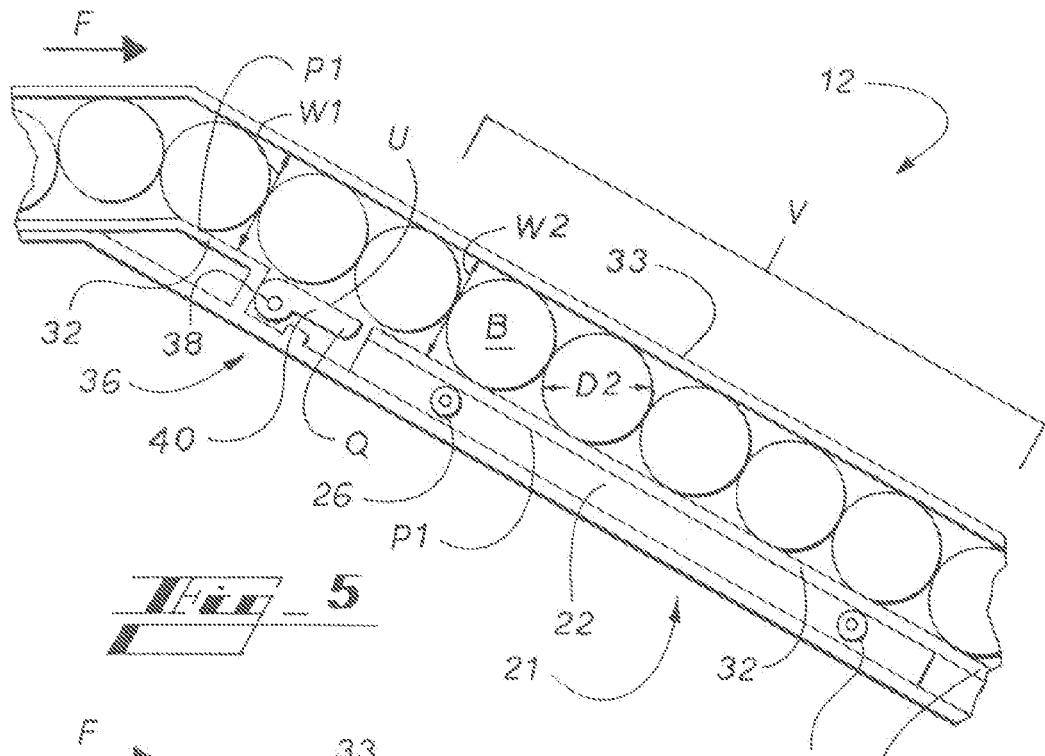
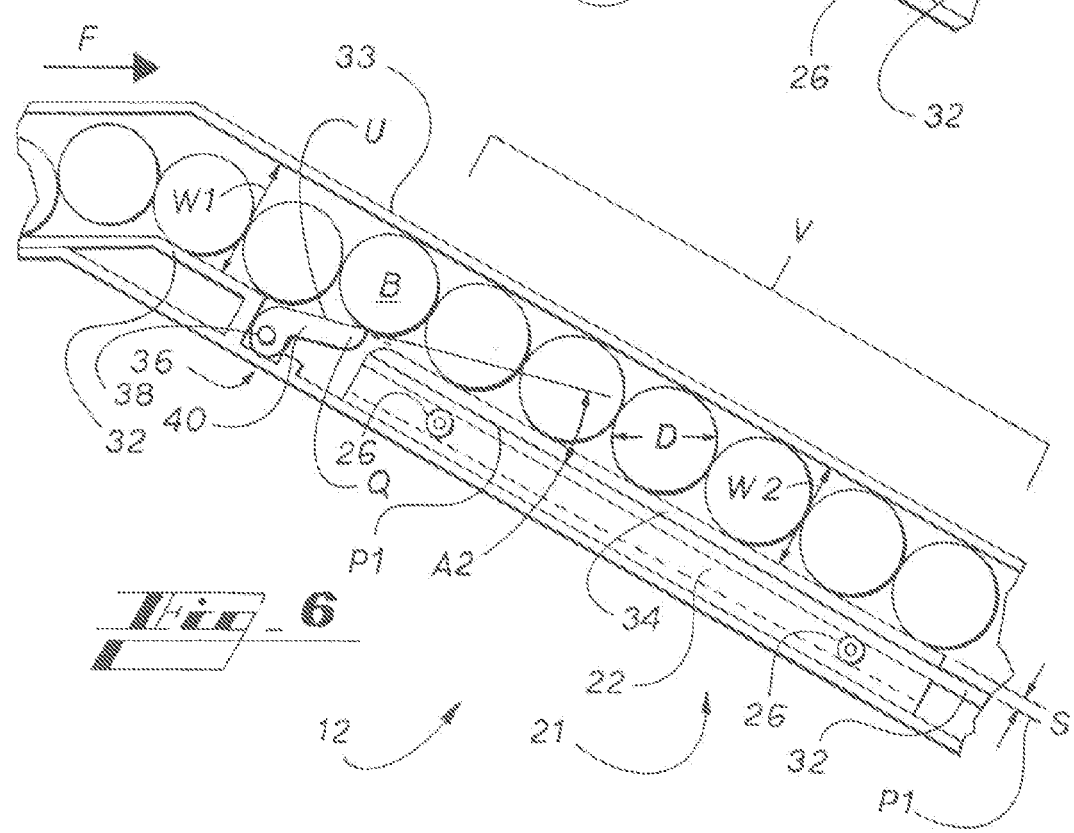

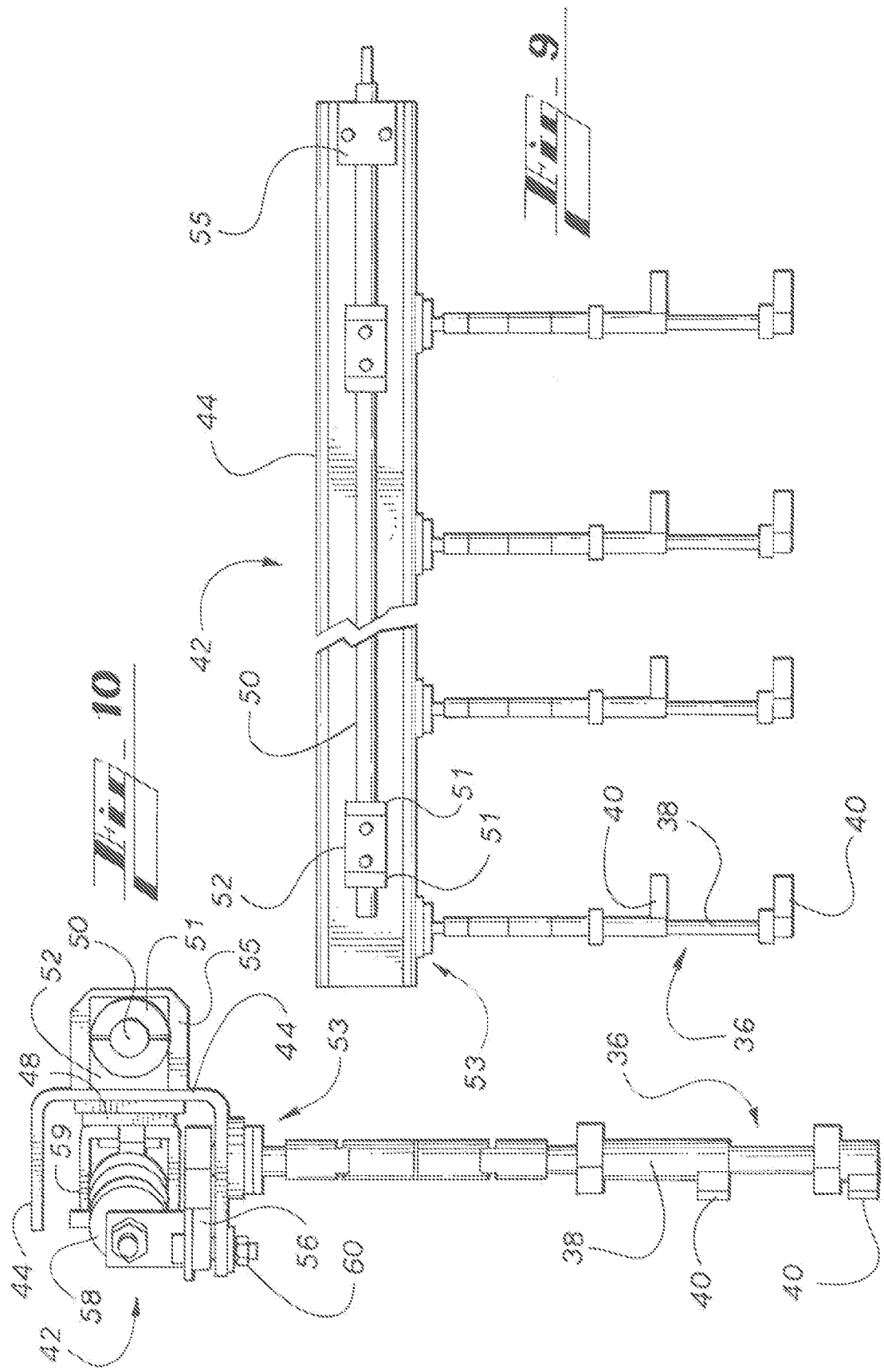

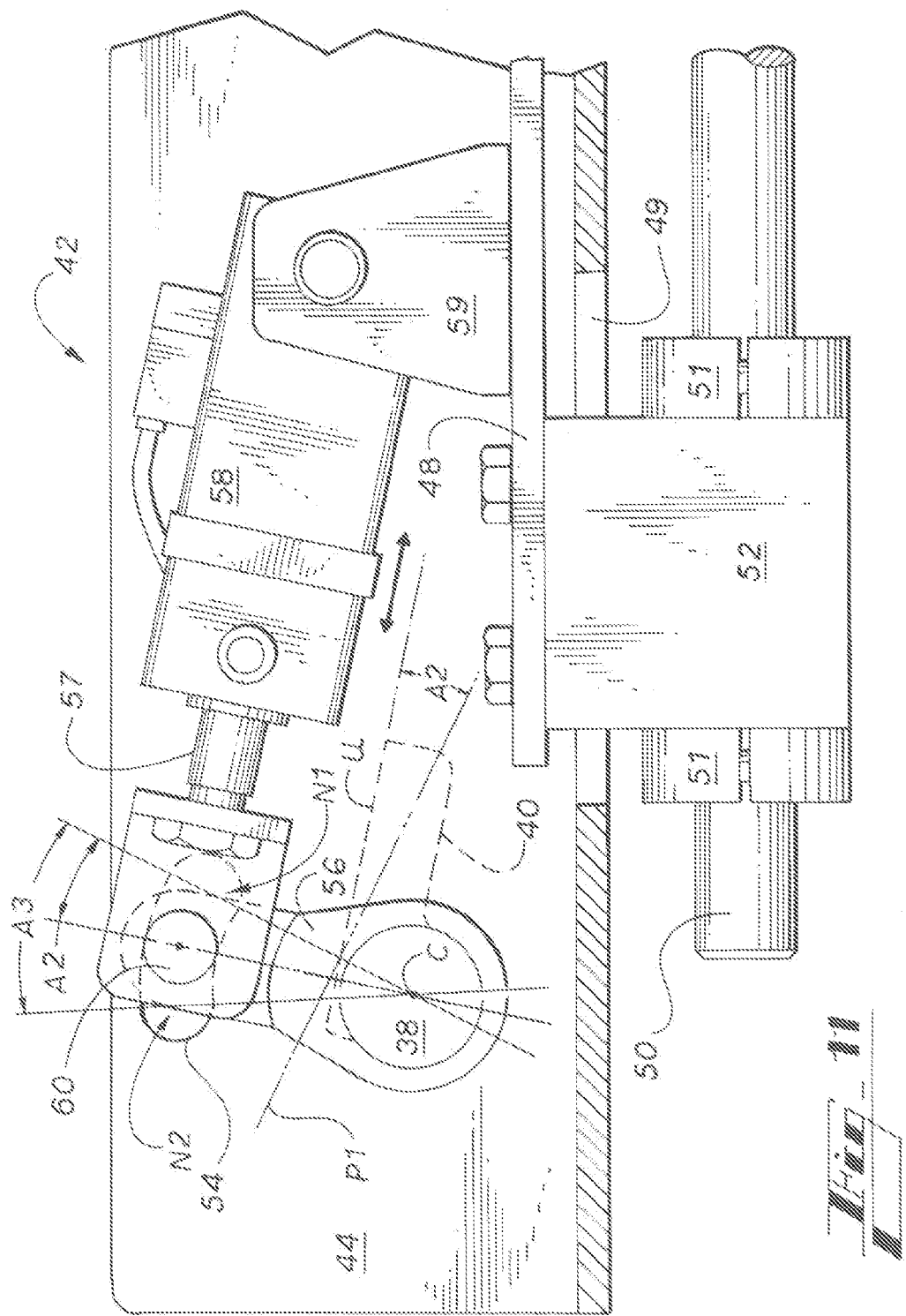

ADJUSTABLE LANE ASSEMBLY

CROSS-REFERENCE TO RELATED APPLICATIONS

This application claims priority to U.S. Provisional Application No. 60/745,996, filed Apr. 28, 2006, the entirety of which is incorporated herein by reference.

TECHNICAL FIELD

This invention relates generally to packaging machinery and systems, and more specifically to a packaging machine with an adjustable lane assembly for accommodating articles for various sizes.

BACKGROUND OF THE INVENTION

Many packaging machines include several conveyors that underlie multiple lanes which direct cylindrical articles, such as bottles or cans, across conveyors in the process of grouping and packaging the articles. For example, articles are commonly brought into the packaging machine via an infeed conveyor that feeds the articles to a metering chain, which provides a timing function and buffers the relatively high infeed line pressure. Upon exiting the metering chain, which may in essence be a linear star wheel, the articles in a single lane tend to be somewhat staggered as they transition onto a grouping conveyor. One purpose of the grouping conveyor is to order the articles into a substantially single file, and so, it is desirable for the width of each lane to be only slightly greater the diameter of articles before the articles exit the grouping conveyor. The articles are thereby predictably arranged, for example, to facilitate separating the articles into groups on a pocket conveyor that awaits downstream and to prevent unnecessary wobbling or ether variance in trajectory that increases the likelihood of damaging the articles.

Packaging machines generally do not have the flexibility to "changeover," that is to be reconfigured between runs to group articles that vary in size or diameter. Given the size, cost, and complexity of these machines, this lack of versatility is expensive. Therefore, it is advantageous to design machines which are as adaptable as possible.

It is desirable for such a packaging machine to have the ability to process articles of different diameters. For example, it is desired that the packaging machine can accommodate a first run of articles having a first diameter and can be changed over to accommodate a second run of articles having a second diameter that differ from the first diameter.

To group and package articles of different diameters, previous packaging machine designs allow for the installation of a lane insert that is mounted to one of the walls of the lane. The lane insert narrows the width of at least a portion of the length of the lane to correspond to the desired article diameter plus an allowable tolerance. Thereby the narrow portion of the lane orders the articles in a single file line with predictable distances between the centers of the articles. This predictable arrangement prepares the articles for engagement by lugs on a metering conveyor. The lane inserts are removable and typically can be interchanged with lane inserts of a different thickness to adjust for articles of different diameters. However, interchanging lane inserts is a time consuming process and it is impractical to have a set of lane inserts corresponding to every possible diameter of article to be packaged.

Articles can also be damaged upon leaving the lanes, if the articles are not deposited on the next conveyor in an orderly fashion. Typically, the outfeed ends of the lanes have been aligned with an edge of the pocket conveyor such that each row of articles exiting the lanes is moved or pushed onto the pocket conveyor by an incoming row of articles, thereby defining a matrix like group of articles. Each additional incoming row of articles must push with increasing force to move the previously formed rows of the group. In this arrangement, articles of any diameter with even a minimal gap between rows and articles may damage one another when pushing each other onto the pocket conveyor. For example, adhesive labels or directly deposited graphics may be scuffed or otherwise damaged.

To address this shortcoming, certain other lane assemblies extend the outfeed ends of the lane assembly a fixed distance over the pocket conveyor such that the rows of articles do not push against one another when exiting the pocket conveyor. However, if such a lane assembly is utilized in a packaging machine that can be changed over to process articles of various diameters, the gap between rows of articles of a first diameter will differ from that of articles of a second diameter so there will not be a tight and orderly formation of grouped articles. It is desirable to minimize potential damage by controlling the spacing of articles as they exit the lanes onto the pocket conveyor.

Therefore, a heretofore unaddressed need exists in the industry for a lane assembly that is easily and selectively adjustable to vary the width of the lane according to the diameter of the article and to control the position of and gap between rows of articles exiting the lanes.

SUMMARY OF THE INVENTION

The present addresses the aforementioned shortcomings in the prior art by providing a lane assembly for a packaging machine that can be easily adjusted to facilitate fast and efficient changeover, as well as the added advantage of increasing the level of flow control by incorporating a cycle stop feature.

The various embodiments of the invention will be described, and are particularly applicable in the context of a packaging machine having multiple lanes for guiding articles, such as bottles or cans. Each lane is defined at least in part by an inside lane guide and an outside lane guide that are spaced apart to define a fixed width.

Generally described, the lane assembly of the present invention is capable of being adjusted for changeover and flow control by providing means for selectively and reversibly varying the width of at least a portion of each lane, means for adjustably diverting or blocking the flow of articles in each lane, and varying the degree to which the outfeed ends of the lane assembly extend over the pocket conveyor. The adjustments can be performed automatically or manually by an operator without the need for substituting parts or directly accessing areas of the packaging machine that are relatively difficult to access.

More specifically, the various embodiments of the lane assembly include multiple lanes each having any or all of the following elements: an adjustable guide, a pivotable transition gate, and extendable lane extensions. Each of these elements is adjustably operatively associated with a lane defined in part by an inside lane guide and an outside line guide. The elements are duplicated for each line.

An adjustable guide is adjustably mounted within each of the lanes, and preferably within a relatively downstream portion of the lanes that is biased with respect to the direction of flow in which an underlying conveyor is driving the articles. More precisely, the adjustable guide is located at a point at which it is desirable to ensure that the articles in any one lane are in a single file. At this point, adjustability is desired to define the single file of articles while providing the optimal amount of play to ensure that the articles flow freely with minimal damage. This optimization is desirable regardless of the size of article that is traveling down the lane in a particular run. To supply this flexibility, the adjustable guide is capable of variably and reversibly extending into the lane to translate or extend to narrow and define an adjustable width portion of the lane as needed to conform to the article diameter.

At any point in time, the adjustable width portion has an adjusted width that is no greater than the fixed width of the remainder of the lane. When fully retracted, the adjustable guide does not substantially protrude into the lane, thereby permitting orderly passage of the largest articles that the packaging is intended to process. When fully extended, the adjustable guide protrudes into the lane so as to permit orderly passage of the smallest diameter articles that the packaging is intended to process. The adjustable guide can be incrementally extended or retracted to permit orderly passage of articles of any diameter therebetween. In certain embodiments, the adjustable guide comprises an elongated bar that is extendable toward the outside lane guide and retractable toward the inside lane guide, wherein when fully retracted, the adjustable guide is spaced apart from the outside lane guide by at least the width of the fixed width portion of the lane. In certain embodiments, the adjustable guide extends through a void in one wall of the lane and toward the opposite wall.

The pivotable transition gate functions to transition articles from the upstream fixed width portion of the lane to the adjustable width portion of the lane so that the adjustable guide does not abruptly change the width of the lane so as to impede the rate of flow. In other words, the transition gate ramps the articles to the narrowed portion of the lane by gradually guiding the articles from the fixed width portion to said adjustable width portion of the lane. Its fixed end is mounted upstream of the adjustable guide and its free end is normally directed generally toward the outfeed end of the lane. The free end is adjacent to said transition guide and can variably swivel into the lane to divert the articles so that they flow easily and fluidly into the narrowed portion of the lane when machine is set up to run smaller articles. The pivotable transition gate has a range of motion and a control mechanism that provides an unlimited number of operating positions. To permit unfettered passage of the largest articles that the packaging is intended to process, the transition gate is substantially fully opened, that is, flush with a wall of the lane so as to be substantially coplanar with a first plane defined by the inside lane guide. To completely staunch the flow of articles, the transition gate pivots to its maximum extent, thereby defining a prime-clear position at which point it may be perpendicular to the lane. When the adjustable guide protrudes into the lane, the transition gate is pivots to the extent necessary to divert the articles past the upstream edge of the adjustable guide, thereby defining one of infinitely numerous possible running positions.

The transition gate is variably pivotally moveable between the fully opened position and a running position at which the contact surface is at an acute angle with respect to the first plane. To completely block the flow, the transition gate is also pivots in a single motion from either the fully opened position or any possible running position to the prime-clear position at the extreme of the angular range defined by the inside guide.

As noted above, the packaging machine includes multiple lanes each including at least one of the adjustable guide, the pivotable transition gate, and the extendable lane extensions. According to one aspect of the invention, all of these elements may be manually or automatically adjustable, and each group of like elements may be adjusted or operated in unison. The disparate groups of elements may also be synchronized such that for an article of given size, all adjustable guides, pivotable transition gates, and lane extensions are adjusted at once or in a choreographed fashion. Manual adjustments may be made by mechanical means such as crank wheels, spring loaded detent pins, and thumb screws. Automatic adjustments may be made using electromechanical means such as pneumatic devices, electromagnets, and motors. Automatic adjustments may be effected via human interaction with an input device such as a push button or switch, or via electronic control devices such as programmable logic controllers (PLCs).

The lane extensions extend and retract from the downstream ends of at least one of a pair of lane dividers that define the lane guides of each lane to control the position and compactness of groups of articles that are formed as the articles leave the lanes.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

BRIEF DESCRIPTION OF THE DRAWINGS

FIG. 3 is a partial perspective view of an exemplary guide bar assembly of the packaging machine of FIG. 1.

FIG. 4 is a partial exploded view of the guide bar assembly of FIG. 3.

FIG. 5-7 are partial plan views of the lane of FIG. 2 showing operation of a transition gate and a guide bar.

FIG. 9 is a side elevation of the control system of FIG. 8.

FIG. 10 is an end elevation view of the control system of FIG. 8.

FIG. 11 is a partial plan view of the control system of FIG. 8.

FIG. 12 is a partial perspective view of the outfeed end of a lane of the packaging machine of FIG. 1 showing an embodiment of an exemplary lane extension, according to the present invention.

DETAILED DESCRIPTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
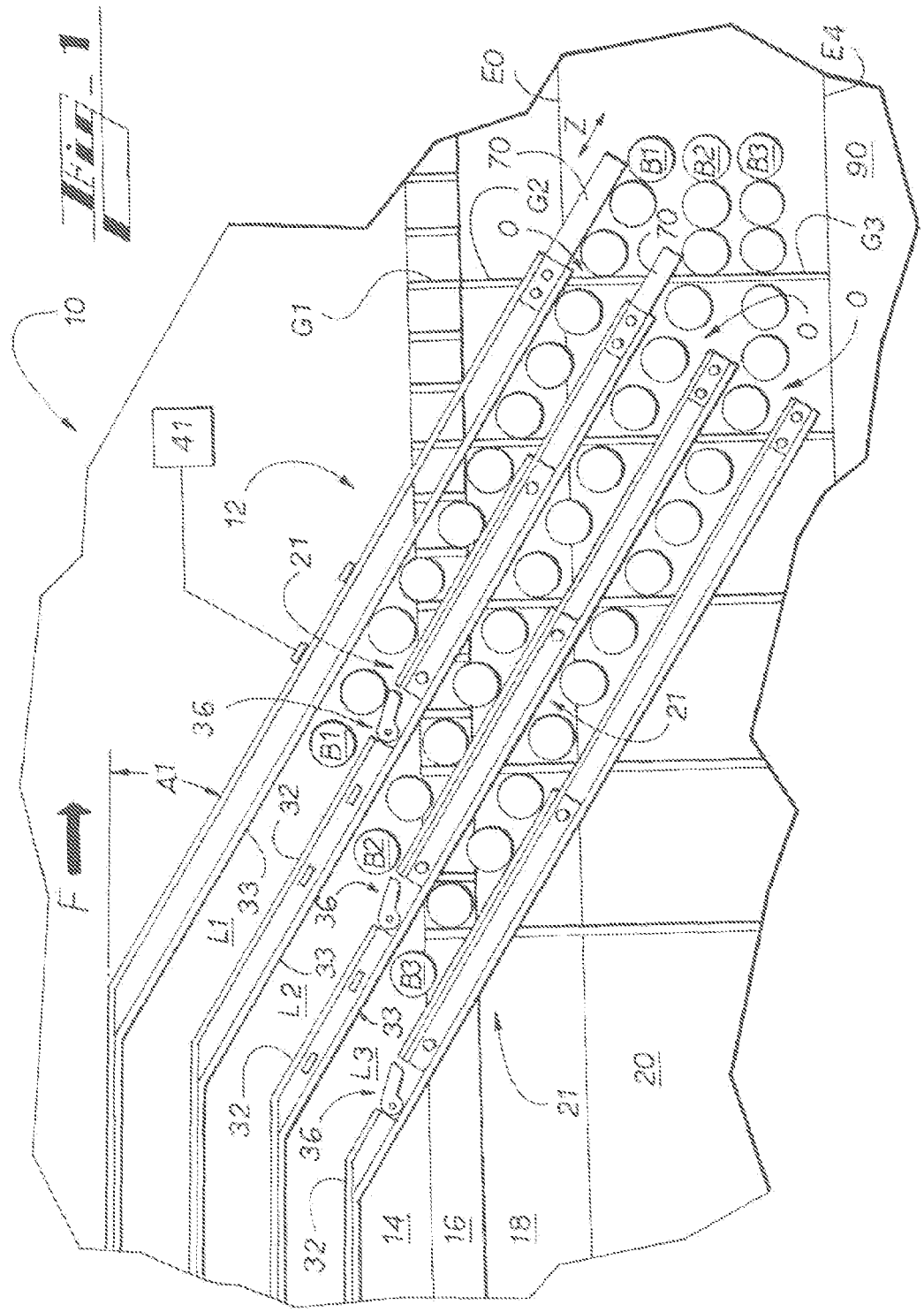
FIG. 1 is a partial plan view of an embodiment of an exemplary packaging machine, according to the present invention.

Referring now to the drawings, wherein like numerals indicate like elements throughout the several views, the drawings illustrate certain of the various aspects of an exemplary embodiment of a packaging machine 10, as shown in FIG. 1. Generally described, the packaging machine 10 includes a lane assembly 12 that includes lanes L which guide cylindrical articles B, such as cans or bottles, across a series of substantially parallel conveyors, which support the articles B and move the articles B in a flow direction F. Certain of the conveyors include lugs that contact certain articles B that are traveling in the lanes to separate the articles B into groups.

Referring to FIG. 1, the exemplary packaging machine 10 includes three lanes L1, L2, L3 and three streams of articles B1, B2, B3 that follow a path through respective ones of the lanes L1, L2, L3. For purposes of teaching, letters "B" will be used to refer generally to certain or all of the articles B1, B2, B3 and the letter "L" will be used to refer generally to certain or all of the lanes L1, L2, L3.

The lane assembly 12 includes certain features which provide that the lanes L can be configured to adapt to the diameter of an article B that falls within a selected range of article diameters. Specifically, the features of the lane assembly 12 provide that the articles are aligned so as to be predictably positioned within the lanes L and that the articles B are controllably arranged as the articles B exit the lanes L.

The terms "upstream", "downstream", "trailing", and "leading" are used herein with respect to the flow direction F and to the path of the articles or the path defined by the lane L. The terms can be used to describe the direction of movement of elements or to describe the relative position of elements with respect to one another. Specifically, the terms "upstream" and "downstream" can refer to elements having fixed positions, for example, where a downstream element is positioned at a distance in the flow direction F from an upstream element. Downstream movement is movement in the flow direction F and upstream movement is movement opposite the flow direction F. Further, the terms "leading" and "trailing" can refer to elements that are moving in the flow direction F, for example, where the leading element is further along in the flow direction F than the trailing element.

The terms "longitudinal" and "transverse" are used herein to describe movement or alignment with respect to the lane path or article path. Specifically, the term longitudinal can be used to describe movement or alignment with the lane path or article path and the term transverse can be used to describe movement or alignment that is substantially perpendicular to the lane path or article path. The lanes L at least partially define the path of the articles B therethrough.

Referring to FIG. 1, the series of parallel conveyors of the packaging machine 10 may include infeed conveyors, metering conveyors, grouping conveyors, pocket conveyors, bridge conveyors, carton conveyors, and the like. In the exemplary embodiment, the packaging machine 10 includes an infeed conveyor 14 that supports and transports the articles B through the most upstream length of the lanes L and establishes back pressure to keep the articles B moving through lanes L. The packaging machine 10 also includes a metering conveyor 16 that includes attached lugs G1, which separate or meter articles B from the articles B in the most upstream length of the lanes L. Thereby, consistent and repeatable spacing is established between the articles B in each lane L downstream of the metering conveyor 16. Further, surging and back pressure that is caused by the articles B pushing one another through the lanes L is relieved by the metering conveyor 16. Thus, the metered articles B are predictably positioned to be grouped as the metered articles B exit the metering conveyor 16 and enter a grouping conveyor 18, which includes grouping or separating devices such as lugs G2. Once the articles B are separated into groups within the lanes L by the grouping conveyor 18, the articles B exit the outfeed ends O of the lanes L onto a pocket conveyor 20, which includes grouping or separating devices such as lugs G3, and the groups in each lane are combined into a larger group that is to be loaded into a carton on a carton conveyor 90.

It should be understood that the speed of the metering conveyor 16 relative to that of the grouping conveyor 18 determines the number of articles B disposed in each row or group of articles B that exits the outfeed end O of each lane L. The metering conveyor 16 can move at a speed that is slower than, faster than, or equal to that of the grouping conveyor 18 to alter the configuration of a group of articles B disposed on the pocket conveyor 20.

In the exemplary embodiment, each lane L includes a substantially straight upstream portion, which is substantially parallel to the flow direction F, and a biased or otherwise angled downstream portion, which is at an angle A1 with respect to the flow direction F. The angled portion of each lane L guides articles B from the infeed conveyor 14 across the metering conveyor 16, grouping conveyor 18, and onto the pocket conveyor 20. The lanes L can be characterized or distinguished from one another in that articles B3 in the innermost lane L3 have the shortest path through the lane assembly 12 before encountering the metering conveyor 16. Conversely, articles B1 in the outermost lane L1 have the longest path through the lane assembly 12 before encountering the metering conveyor 16.

For clarity, a single lane L is shown in FIGS. 2 and 5-7 and described below. The lanes L of the lane assembly 12 are substantially similar such that the description of one lane L is generally applicable to all the lanes L of the lane assembly 12.

In general, a single run of articles B though the packaging machine 10 will involve substantially identical articles B having the same first diameter. A subsequent run may involve substantially identical articles B having a second diameter that is less than or greater than the first diameter. Therefore, the width of a portion of each lane L in the lane assembly 12 is accordingly adjusted, preferably between runs, as described below, it is also contemplated that a single run may involve articles B that vary in diameter, for example, in a process where a variety pack of disparate articles B are packaged. In such embodiments, the lane assembly 12 is adjusted on the fly.

Figure 2:
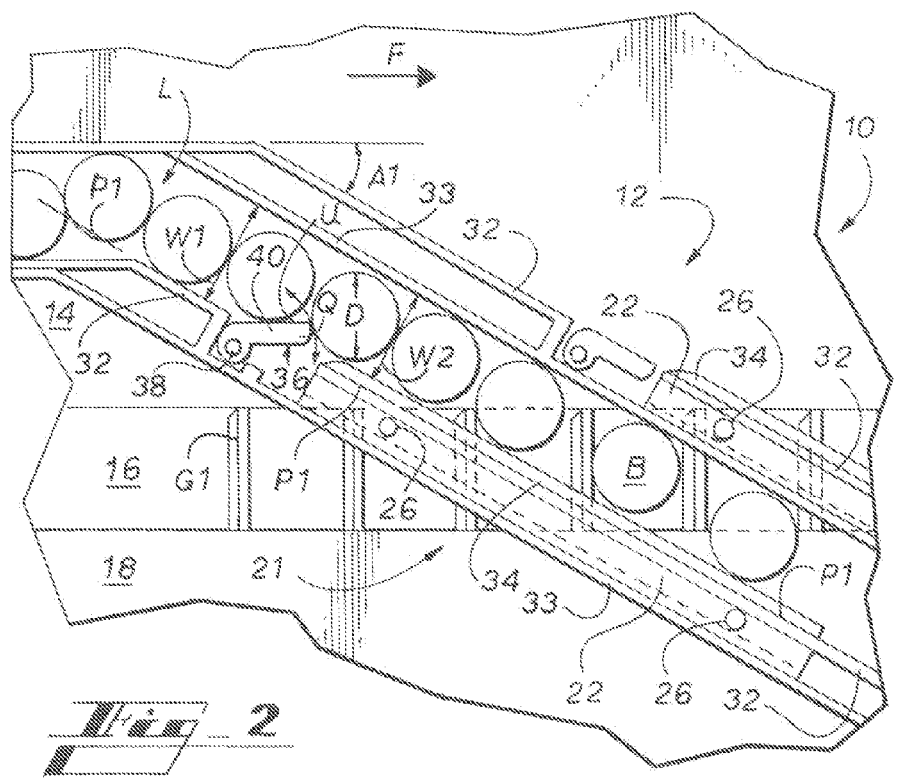
FIG. 2 is a partial plan view of a lane of the exemplary packaging machine of FIG. 1.

Referring to FIG. 2, each lane L of the lane assembly 12 is defined by inside and outside lane guides 32, 33 and is adjustable to accommodate cylindrical articles B of various diameters ranging from a smallest diameter to a largest diameter. The inside lane guide 32 of one lane L is spaced apart from an outside lane guide 33 of an adjacent lane L. A space is provided between the inner and outer lane guides 32, 33 of adjacent lanes L to facilitate the inclusion of elements that define an adjustable portion V of each lane L, as described in further detail below.

The width W1 of a fixed portion of each lane L is defined between the outside lane guide 33 and the inside lane guide 32. In the angled portion of each lane L, articles B are generally held against and deflected by the outside lane guide 33 since the infeed conveyor 14 that drives the articles B moves in the flow direction F. The lane width W1 is defined by or is a function of the largest diameter of articles B to be handled in the lane assembly 12, with an allowance for a desired tolerance to reduce friction.

Each lane L further includes elements that define an adjustable portion V thereof along which the centers of articles B are substantially aligned so as to be engaged by the metering conveyor 16. Referring to FIGS. 2-4, the adjustable portion V of each lane L is defined by an adjustable guide bar 34 that is disposed opposite, and parallel to, a portion of the outside lane guide 33.

Referring to FIGS. 3 and 4, each guide bar 34 is part of a guide bar assembly 21 that facilitates adjusting the transverse position of the guide bar 34. The guide bar assembly 21 includes a support member 22, a threaded anchor panel 24, and the adjustable guide bar 34. The guide bar assembly 21 is assembled by inserting bolts 26 through bolt holes (best shown in FIG. 4) in the support member 22 and through slots 28 in the adjustable guide bar 34. The bolts 26 are secured in threaded holes in the threaded anchor panel 24. The support member 22 is secured to the outer lane guide 33 for each lane L. The adjustable guide bar 34 can be adjusted by loosening the bolts 26 and translating the adjustable guide bar 34 relative to the support member 22, as allowed by the slots 28. In the exemplary embodiment, the bolt holes in the support member 22 are defined by recesses in an edge of the support member 22 and a portion of the inside lane guide 32. Specifically, the portion of the inside lane guide 32 closes an open side of the recesses to form the bolt holes.

Referring to FIGS. 2, 3 and 5-7, the adjustable guide bar 34 can be transversely positioned relative to the outside lane guide 33 to define a adjusted width W2 that is equal to or less than the lane width W1. The adjusted width W2 can be adjusted to correspond to articles B with a diameter that is between the largest diameter and the smallest diameter, inclusive. For example, referring to FIG. 5, if the articles B to be handled in the lane assembly 12 have a larger diameter D2, the inside surface of the adjustable guide bar 34 can be adjusted to be substantially coplanar with a plane P1. The plane P1 is defined by the inside surface of the angled portion of the inside lane guide 32. In this arrangement, the width W2 is substantially equal to the width W1. Referring to FIG. 6, for an article with a smaller diameter D1, which is less than the larger diameter D2, the adjustable guide bar 34 is adjusted such that the contacting surface of the adjustable guide bar 34 is offset from the plane P1 by an offset distance S and is parallel to the plane P1.

Referring again to FIG. 2, a transition gate 36 is positioned to be adjacent to the upstream end of the adjustable guide bar 34. The transition gate 36 includes a vertical shaft 38 and a pair of horizontal arms 40 (shown in FIGS. 8-10) that are fixedly mounted to, and extend away from, the shaft 38. The shaft 38, which defines the pivot axis of the arms 40, is rotatable to move the arms 40 from a fully opened position (shown in FIG. 5) where the engaging surface U of each of the arms 40 is substantially coplanar with the plane P1 to a running or prime-clear position (shown in FIGS. 6 and 7, respectively) where the engaging surface U of each of the arms 40 is at an angle with respect to the plane P1.

Figure 8:
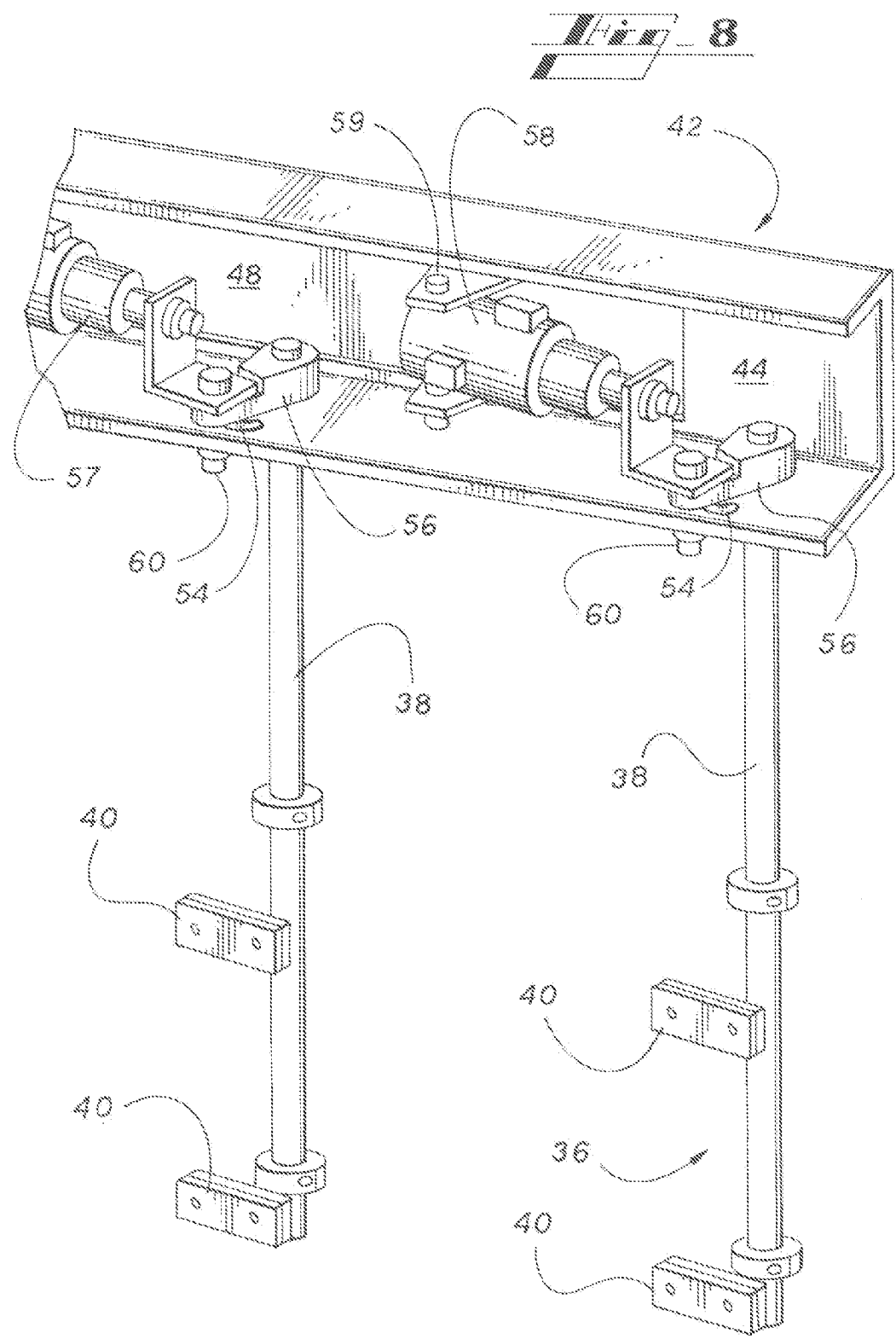
FIG. 8 is a partial perspective view of an embodiment of an exemplary control system for the transition gate of FIGS. 5-7, according to the present invention.

Optionally, in the exemplary embodiment, each transition gate 36 includes two arms 40. Referring momentarily to FIGS. 8 and 9, the position or elevation of each of the two arms 40 of the transition gate 36 has been optimized so that the transition gate 36 engages an article B, such as a bottle, above and below the label and, in doing so, does not damage the label of the bottle. Specifically, the upper arm 40 is manually adjustable to align with and engage the shoulder of the bottle and the lower arm 40 is fixed so as to align with and engage the heel of the bottle. Alternatively, either or both of the arms 40 can be fixed or adjustable.

Rotating or pivotally moving the distal ends the arms 40 into the lane L provides multiple functions. As mentioned above, the adjustable guide bar 34 can be transversely positioned such that the width W2 of the adjustable portion V of the lane L is less than the width W1 of the fixed portion of the lane L. However, transversely positioning the adjustable guide bar 34 such that it is offset from the plane P1 by an offset distance S has the potential to create an obstruction in the lane L at the upstream end of the adjustable portion V of the lane L. In other words, the sharp transition in the width of the lane L, from width W1 to width W2, can obstruct the flow of articles B, which can become stuck in the lane L upon encountering the sharp transition.

Referring to FIG. 6, each of the arms 40 can be rotated to a running position where the engaging surfaces U of the arms 40 defines an angle A2 with respect to the plane F1 and provide a transition surface or ramp between the vertical contact surface of the inside lane guide 32 and the vertical contacting surface of the adjustable guide bar 34. The length of each arm 40 is such that a free or distal end Q thereof extends substantially to the potentially obstructing corner or edge of the adjustable guide bar 34 when the arms 40 are in the running position. In this fashion, a gap between the distal end Q of the arms 40 and the potentially obstructing portion of the adjustable guide bar 34 is eliminated. To provide a transition surface or ramp, the distal end Q of each arm 40 may be somewhat offset from, if not exactly in, the plane defined by the vertical contacting surface of the adjustable guide bar 34, as viewed in FIG. 6. The elevation of each arm 40 may be higher or lower than that of the adjustable guide 34, for example, to prevent the arms 40 from contacting the adjustable guide bar 34.

Figure 7:
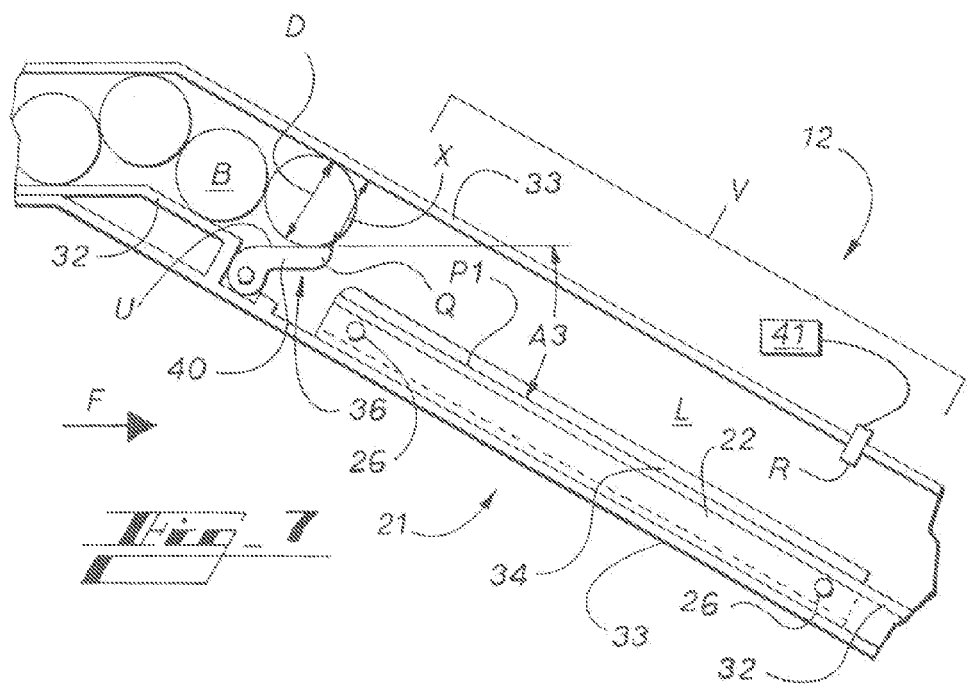

Referring to FIG. 7, each of the arms 40 can be rotated to the prime-clear position where the engaging surfaces U define an angle A3 with respect to the plane P1 and the distal end Q of each arm 40 is a distance X from the outside lane guide 33. The distance X is generally selected to be less than the smallest diameter of articles B handled by the lane assembly 12 such that the transition gate 36 stops articles B having any diameter D, in the range from the smallest diameter to the largest diameter, from traveling in the lane L. The transition gate 36 may stop articles B from traveling in the lane L before beginning a run, at the end of a run, or upon identification by a processing means, such as a programmable logic controller (PLC) 41, of a fault condition detected by a sensor R. The PLC 41 is described in further detail below. Those skilled in the art will recognize that, to stop the flow of articles B, the distance X can be any value that is less than the diameter D of articles B that are currently being run through the lane L.

Referring to FIGS. 8-11 an adjustment system 42 controls the rotation of the transition gates 36 into the lanes L. The adjustment system 42 includes multiple mechanisms for rotating the gates 36. In the exemplary embodiment, a first mechanism facilitates rotation or pivotal movement of the arms 40 to a running position while a second mechanism facilitates rotation or pivotal movement of the arms 40 to the prime-clear position from the fully opened position or any of a potentially infinite number of running positions.

Referring to FIGS. 8-11, the adjustment system 42 includes a C-shaped frame 44 that is suspended above the lanes L by columns mounted to the frame (not shown) of the packaging machine 10. A plate 48 is disposed alongside the inside surface of the vertical portion of the frame 44. A nod 50 (shown in FIGS. 9, 10 and 11) is disposed alongside the outside surface of the vertical portion of the frame 44. Bearing blocks 52 (shown in FIGS. 9, 10 and 11), are slidably mounted to the frame 44 through slots 49 (shown in FIG. 11) in the vertical portion of the frame 44, which facilitate sliding movement along the length of the frame 44. Each bearing block 52 is slidably connected to the rod 50 and fixedly connected to the plate 43. As best shown in FIGS. 9-11, a pair of clamp collars 51, 51 is fixedly mounted to the rod 50 on opposite sides of each bearing block 52 such that, when the rod 50 moves one way or the other along the length of the frame 44, the bearing blocks 52 move along with the rod 50. As a result, the rod 50, the bearing blocks 52, and the plate 48 move as one and longitudinally translate along the length of the frame 44.

The upper end of each shaft 38 is supported by a rotational bearing 53 (shown in FIG. 10) that is received in a circular aperture in the lower horizontal portion of the frame 44. The lower end of each shaft 38 can be supported by a bearing block (not shown), which is mounted in the space between lanes L and adjacent to the upstream end of the adjustable guide bar 34. Referring to FIG. 11, an arcuate slot 54 is defined in the lower horizontal portion of the frame 44. The arcuate slot 54 is adjacent to the upper end of each shaft 38. The arcuate slot 54 and the circular aperture have substantially the same center point C, which defines the axis of rotation of the shaft 38.

Referring to FIG. 11, the proximal end of a pivoting lever 56 is fixedly attached to the upper end of each shaft 38. The proximal end of an air cylinder 58 is pivotally mounted to the plate 48 by a trunnion clevis 59 and the distal end of the air cylinder 58 is pivotally connected to the distal end of the pivoting lever 56 by a shoulder screw 60. The lower end of the shoulder screw 60 extends into the arcuate slot 54. Thereby, the shoulder screw 60 cooperates with the arcuate slot 54 to limit the rotational movement of the pivoting lever 56 within the angular range, which relates to the measure of the angle A3, defined by the arcuate slot 54. Thus, the rotation of the shaft 38 and the gate 38 is also limited to the angular range A3 due to the limited movement of the shoulder screw 60 within the arcuate slot 54.

Exemplary operations of the adjustment system 42 are now described for purposes of teaching. While the plunger 57 of the air cylinder 58 is fully retracted, the rod 50 may be moved along the length of the frame 44 to change the position of the shoulder screw 60 along the length of the arcuate slot 54 and thereby control the angular position of the associated arms 40. For example, when the rod 50 is moved to the right from the position shown in FIG. 11 to take a fully retracted position (not shown), the shoulder screw 60 is moved to the first end N1 of the arcuate slot 54 whereupon the engaging surface U of each of the arms 40 is substantially coplanar with the plane P1. When the rod 50 is moved from the fully retracted position to a partially or fully extended position, as shown in FIG. 11, the shoulder screw 60 moves an angular distance defined by an angle A2 from the first end N1 to an intermediate position between first and second ends N1 and N2 of the arcuate slot 54. When the shoulder screw 60 is positioned such that the pivoting lever 56 is rotated to the angle A2, with respect to the first end N1, the engaging surface U of each of the arms 40 is at an angle A2 with respect to the plane P1.

The air cylinder 58 may be extended when the rod 50 is at any position including a fully retracted position and a partially extended position. By extending the plunger 57 of the air cylinder 58, the shoulder screw 60 is moved to the second end N2 of the arcuate slot 54 whereupon the engaging surface U of each arm 40 takes the prime-clear position at an angle A3 with respect to the plane P1. The extended length of the air cylinder 58 (or the range of the movement of the cylinder plunger 57) is sufficient to move the shoulder screw 60 from the first end N1 to the second end N2. The second end N2 of the arcuate slot 54 functions to limit the travel of the arms 40 to the prime-clear position.

The air cylinder 58 is selected or designed such that it can tolerate the overload applied thereto when if is extended either partially or fully depending on the position of the rod 50 or otherwise when the extending motion of the air cylinder 58 plunger is interrupted.

The first end N1 of the arcuate slot 54 functions to limit the travel of the arms 40 to the fully opened position where the engaging surface U of each arm 40 is flush with the plane P1. It should be understood by one skilled in the art that the adjustment system 42 may be designed such that the shoulder screw 60 can be moved to the second end N2 by means of the rod 50 while the air cylinder 58 is fully retracted.

In the exemplary embodiment, the rod 50 is threaded at the right-hand end as viewed in FIG. 9 and the end is inserted through a threaded block 55 that is fixedly mounted to the frame 44. The position of the rod 50 relative to the frame 44 can thereby be adjusted by cranking the rod 50. The rod 50 can be cranked manually or automatically, for example, with a motor including input controls.

In the exemplary embodiment, the air cylinder 58 has two positions. The air cylinder 58 can be energized to move its plunger 57 from a fully retracted position to an extended position and from an extended position to a fully refracted position. As suggested above, the extension of the plunger 57 of the air cylinder 58 at its extended position, or at the time the shoulder screw 60 reaches the second end N2, is variable depending on the position of the rod 50 relative to the frame 44. In other words, the energized air cylinder 58 extends its plunger 57 until the shoulder screw 60 comes into contact with the second end N2 of the arcuate slot 54, thereby moving the transition gate to the prime-clear position to stop the flow of the articles. This feature is useful, for example to quickly block the flow in the event of a jam or system malfunction, or at the end of a shift.

In alternative embodiments, a controllable mechanism that can incrementally extend from a first length to a second length may be rotatably mounted to the frame 44 to provide the combined functionality of the translatable rod 50 and the air cylinder 58.

It should be understood that, since all the air cylinders 58 are attached to the plate 48, the running position of each of the arms 40 can be simultaneously adjusted. The air cylinders 58 can be independently energized or simultaneously energized to rotate each arm 40 to the prime-clear position. Furthermore, groups of air cylinders 58 may be fired at once, such as when fewer than all lanes L are being utilized in a given run.

Figure 13:
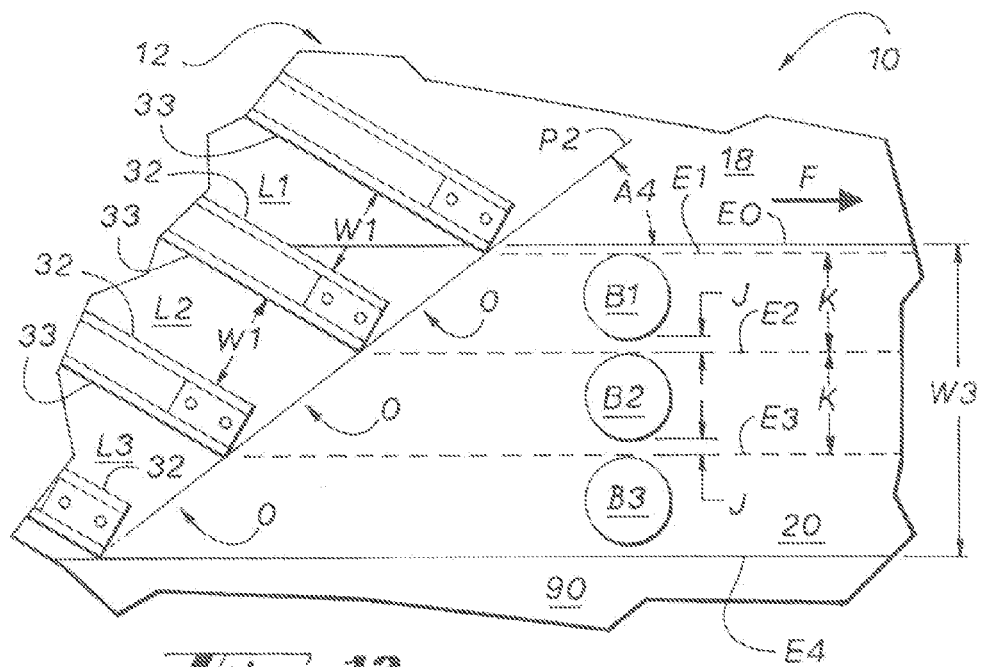
FIG. 13 is a partial plan view of the outfeed ends of the lanes of the packaging machine of FIG. 1, the lane extensions being fully retracted.

Referring to FIGS. 1 and 13, once articles B exit the metering conveyor 16, the articles B are grouped in the lanes L by the grouping conveyor 18 before moving through the outfeed ends O of the lanes L onto the pocket conveyor 20. The lane guide 12 is arranged such that the outfeed ends O of the lanes L extend across over the pocket conveyor 20. This lane guide arrangement, as opposed to one where the downstream ends of the lane guides 32, 33 terminate at or are aligned along the conveyor edge E0, releases the articles exiting the outfeed ends O of the lanes L at positions along the transverse width of the pocket conveyor 20. This lane guide arrangement facilitates spacing the rows of articles B exiting each lane L apart from one another such that the rows of articles B do not push against one another upon entering the pocket conveyor 20.

The outside lane guides 33, with the possible exception of the lane guide 33 that defines the lane L1, extend over the pocket conveyor 20 to release the articles B from the lanes L at different positions along the width of the pocket conveyor 20, relative to the conveyor edge E0. The release positions of the lanes L along the width of the pocket conveyor 20 are represented by notional lines E1, E2, E2. The notional lines E1, E2, E3 extend in parallel with the flow direction F and are defined by roll-off points at the downstream ends of the outside lane guides 33 of the lanes L1, L2, L3, respectively. The articles B1, B2, B3 that exit each lane L1, L2, L3 are tangent to the notional lines E1, E2, E3, respectively. Accordingly, the center of each of the articles B1, B2, B3 is offset from a respective one of the notional lines E1, E2, E3 by a distance that is substantially equal to a half of the diameter of the article B.

In the exemplary embodiment, downstream ends of the outside lane guides 33 are aligned in a plane P2 that is at an angle A4 with respect to the conveyor side edge E0. Consequently, the notional lines E1, E2, E3 are consistently spaced one to the next by a spacing distance K and adjacent rows of articles B1, B2, B3 are consistently spaced apart by a gap J. It should be noted that, since the move-off points are aligned in a plane, the spacing distances K are substantially equal.

It should be recognized that the gap J between the rows of the articles B is substantially the difference between the spacing distance K and the diameter D of the articles B. Controlling the spacing K and/or the gap J is beneficial, for example, to reduce instability as articles B are pushed by a pusher device from the pocket conveyor 20 into cartons and/or to facilitate inserting dividers or partitions info the gaps J.

The angle A4 can be selected based en the diameter of the articles B in a particular run and a desired gap J between the rows of the articles B since, in this example arrangement the angle A4 determines the position of notional lines E1, E2, E3 along the width W3 of the pocket conveyor 20. The width W3 of the pocket conveyor 20 is defined between the conveyor side edges E0, E4.

Referring to FIG. 12, a lane extension 70 is slidably attached or telescopingly connected at the outfeed end O of the associated lane L and is extendable or retractable to, in effect, modify the substantial length of the respective outside lane guide 33. The lane extension 70 slides in the direction of the arrow Z.

In the exemplary embodiment, the lane extension 70 is disposed between an outside lane guide 33 of a lane L and an inside lane guide 32 of an adjacent lane L. A support plate 80 is fixed between the lane guides 32, 33 and bolts 82 extend through apertures in the support plate 80. The lane extension 70 can include a slot (not shown) and an anchor plate (not shown). The bolts 82 extend through the slot and into threaded apertures (not shown) in the anchor plate. This arrangement is similar to that of the guide bar assembly 21. The bolts 82 can tighten the lane extension 70 between the anchor plate and the support plate 80 to fix the position of the lane extension 70.

Thus, the lane extension 70 can be fixed at an extended length to act as an extension of the vertical contacting surface of the outside lane guide 33. The vertical contacting surface of the lane extension 70 and the vertical contact surface of the outside lane guide 33 are substantially coplanar. When lane extensions 70 are extended, the notional lines E1, E2, E3 of the corresponding lanes L are defined by roll-off points at the downstream end of the lane extensions 70. Thus, the lane extensions 70 facilitate controlling the positions of the rows of articles B1, B2, B3 along the width of the pocket conveyor 20.

Figure 14:
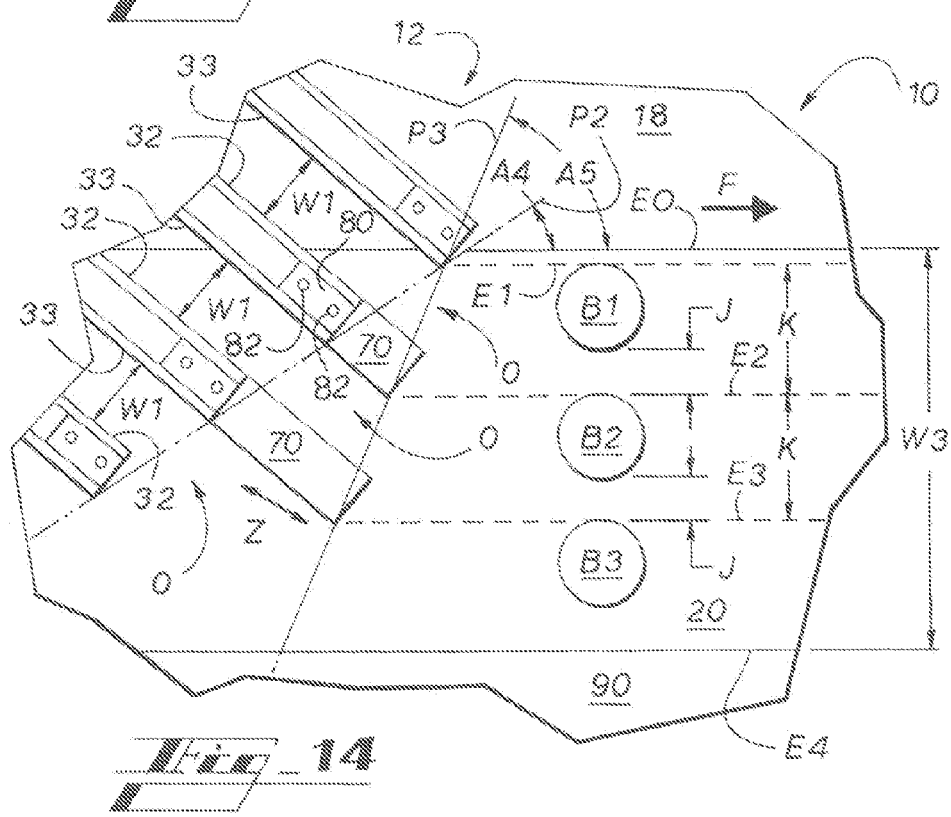
FIG. 14 is a partial plan view of the outfeed ends of the lanes of the packaging machine of FIG. 1 showing certain lane extension being extended in an exemplary arrangement.

An exemplary method of positioning lane extensions to control the position of rows of articles B along the width W3 of the pocket conveyor 20 is now described. Referring to FIGS. 13 and 14, lane extensions 70 that correspond to lanes L2, L3 are extended to change the positions of the notional lines E2, E3. In the exemplary method, the lane extension 70 that corresponds to the lane L1 is not extended such that the position of the notional line E1 remains adjacent to the conveyor edge E0. A printed or engraved scale or other means for indicating the optimal extension of each lane extension 70 may be provided.

Referring to FIG. 14, lane extensions 70 are arranged such that the move-off point of the outside lane guide 33 of the lane L1 and the move-off points of the lane extensions 70 are aligned in a plane P3 that is at an angle A5 with respect to the conveyor side edge E0. By arranging the lane extensions 70 in this manner, the gaps J, spacing distances K, and positions of the notional lines E2, E3 each change with respect to the absence of lane extensions 70 illustrated in FIG. 13, but in a manner that is proportional to the change in the angles A4, A5. Extending the lane extensions 70 increases the spacing distance K between the adjacent notional lines E1, E2, E3 and the notional lines E2, E3 are positioned further from the notional line E1. Thus, for example, if articles of the same diameter were run through each of the lane assemblies 12 illustrated in FIGS. 13 and 14, the rows of articles B exiting the lanes L of the lane assembly illustrated in FIG. 14 would have larger gaps J therebetween than the rows of articles B exiting the lane L of the lane assembly illustrated in FIG. 13.

In certain embodiments, the angle A5 may be ninety degrees, such that the plane P3 is perpendicular to the conveyor edge E0, or even greater than ninety degrees. More generally described, the angle A5 may be selected according to the diameter of the articles B and according to a desired gap J between the article rows.

If should be understood that the arrangement of the lane extensions 70 and the degree of extension of each lane extension 70 are not limited to those described above. Rather, each lane extension 70 may extend any desired distance to properly adjust the gap J between rows of articles B or to control the spacing distance K between or position of notional lines E1, E2, E3, for example, so that articles of different diameters may form a group to be loaded into the same carton.

Figure 15:
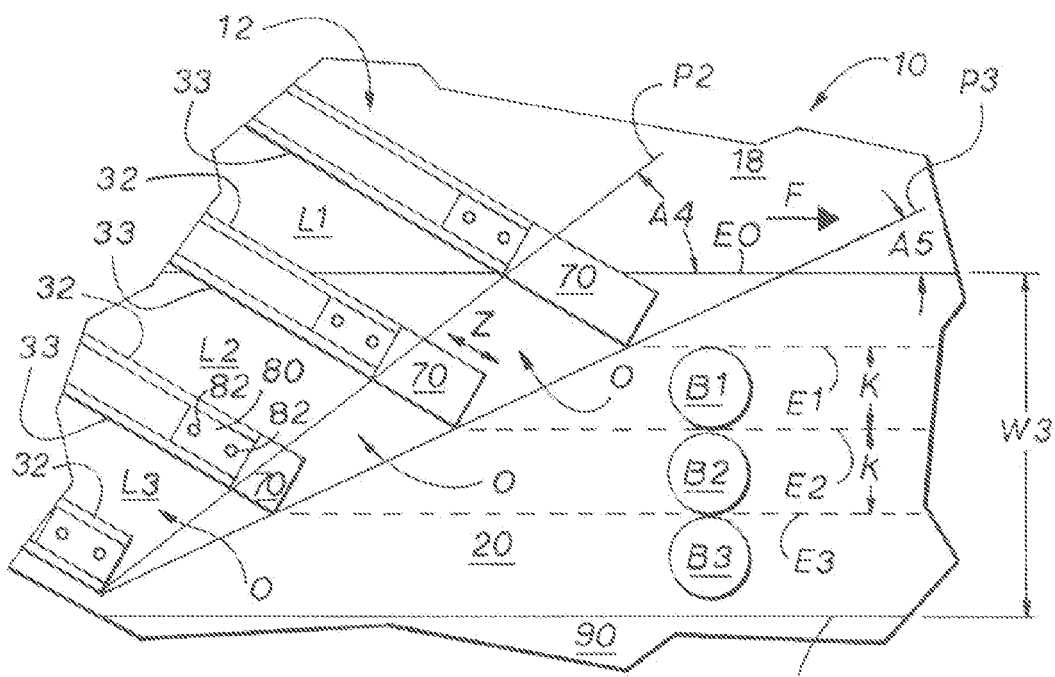
FIGS. 15 and 16 are partial plan views of the outfeed ends of the lanes of the packaging machine of FIG. 1 showing certain lane extensions being extended in alternative arrangements.
Figure 16:
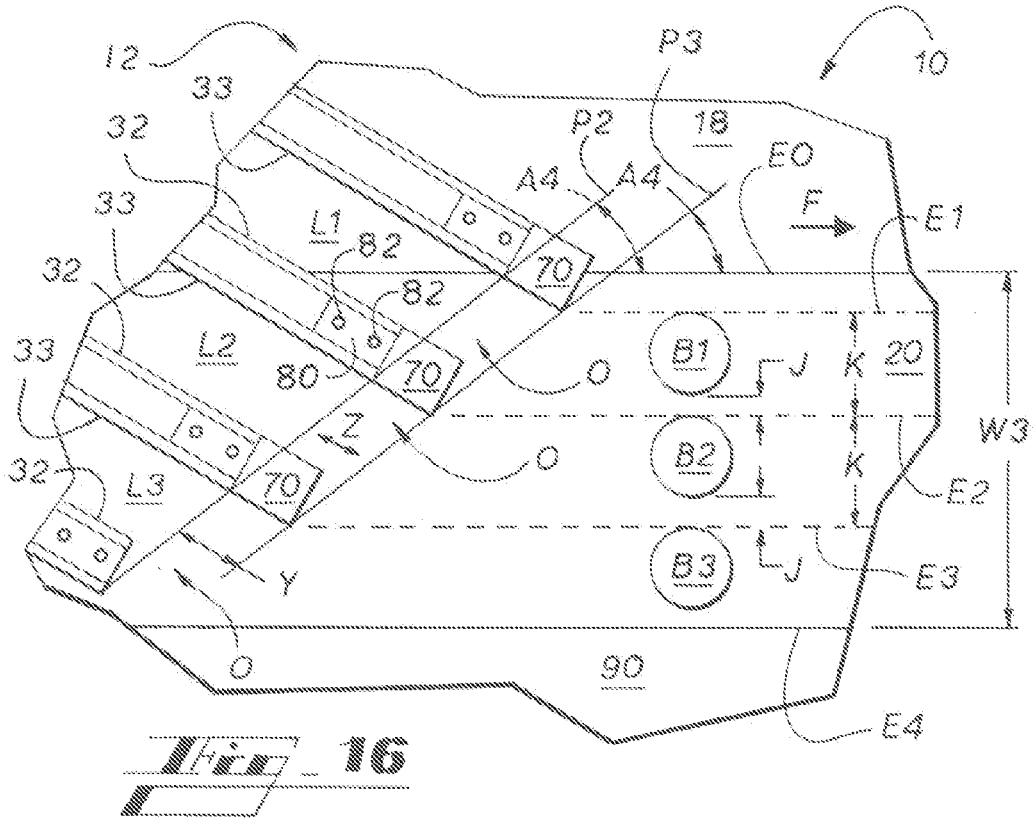

Referring to FIGS. 15 and 16, alternative arrangements of lane extensions 70 are shown. FIG. 15 shows an arrangement wherein lane extensions 70 reduce the spacing K and increase the distance between the conveyor edge E0 and the notional line E1. The move-off points of the lane extensions 70 are aligned in the plane P3, which defines an angle A5 with respect to the conveyor edge E0. The angle A5 is less than the angle A4.

FIG. 16 shows an arrangement wherein lane extensions 70 are proportionally, rather than incrementally, extended to increase the distance between the conveyor edge E0 and the notional lines E1, E2, E3 so as to maintain the original spacing distance K. The lane extensions 70 extend a distance Y such that the move off points thereof are aligned in a plane P3, which is parallel to the plane P2.

Referring to FIG. 1, sensors or an operator may detect certain conditions and supply an input to the programmable logic controller (PLC) 41 to produce a desired response from the adjustment system 42. For example, the sensors R or an operator may detect that there are no more cartons in the hopper, that there is a jam, or that an article B has fallen over. In response, the PLC 41 or the operator may supply inputs that include a stop command, which energizes the air cylinders 58 simultaneously or sequentially. The air cylinders 58 may energize simultaneously if continuing would exacerbate a problem, or the air cylinders 58 may energize sequentially or simultaneously so that the last articles in that run are properly loaded. In other instances, the air cylinders 58 may be energized individually, for example, to clear or empty the lanes L individually.

In the exemplary embodiment, the adjustable guide bars 34, gates 36, and lane extensions 70 can each be adjusted manually. To facilitate manual adjustment of each element, a scale is attached or adjacent to each element. For example, a measurement scale may be attached to the upper surface of the lane extensions 70, and measurement scales may be attached to the lane assembly to extend above the adjustable guide bars 34 and gates 36.

In an alternative embodiment, a controllable adjustment system or device, such as a pneumatic device, may be incorporated for the lane extensions 70 and the adjustable guide bar 34. Further, the adjustment system for the lane extensions 70 and adjustable guide bar 34, a motor used to drive the threaded rod 50 of the adjustment system 42, and the air cylinders 58 may be controlled synchronously by the PLC 41, as described in further detail below. In other words, the position of the plate 48 relative to the frame 44, the offset distance S of each adjustable guide bar 34, the angular position of the engaging surface U of each transition gate 36, and the extension of each lane extension 70 may be adjusted synchronously based on an article diameter D and a desired gap J. For example, referring to FIG. 1, for a desired article diameter D and a desired gap J between articles, the sensors R detect the current position of each element. The sensors R relay the information to the PLC 41, which controls the adjustment systems and mechanisms to change the position of each adjustable guide bar 34, each transition gate 36, and each lane extension 70.

The methods are performed according to one or more user-created logic programs stored on a computer readable medium and executed by the PLC 41. The PLC 41 may be programmed directly, or the logic programs may be downloaded or relayed from a computer (not shown). The PLC 41 has either modular or integral input/output circuitry that monitors the status of field connected sensor inputs and controls attached output actuators, including devices such as motor starters, solenoids, pilot lights/displays, drives, vacuum valves, and the like (not shown) according to the programs stored in the random-access (RAM) portion of memory. A system bus couples memory, sensor R inputs, and output actuators to the PLC 41. If the PLC 41 receives programming from a computer, the computer typically further includes additional computer-readable media, such as low speed storage, such as a hard disk drive or a magnetic disk drive, and the like, to read from or write to a removable disk, and an optical disk drive for reading a CD-ROM disk or to read from or write to other optical media. The hard disk drive, magnetic disk drive, and optical disk drive include a hard disk drive interface, a magnetic disk drive interface, and an optical drive interface, respectively (not shown), for coupling the drives to the system bus. The drives and their associated computer-readable media provide nonvolatile storage for the computer. Although the description of computer-readable medium above refers to a hard disk, a portable USB drive, a removable magnetic disk, a CD-ROM disk, ether types or media readable by a computer, such as magnetic cassettes, flash memory cards, digital video disks, Bernoulli cartridges, and the like, can also be used.

A number of program modules can be stored in the drives and in the RAM portion of memory, including an operating system, one or more application programs, a shared code library, and a browser program module. A user may enter commands and information into the computer through a human/machine interface (HMI), such as but not limited to a keyboard and pointing device, such as a mouse. The HMI may incorporate other input/output devices such as a microphone, joystick, scanner, pushbuttons, LEDs, and the like. These and other input/output devices may be connected to the PLC 41 or the processing unit of the computer through a serial port interface coupled to the system bus, but can be connected by other interfaces, such as a universal serial bus (USB) (not shown). The input/output devices include a monitor or other type of display device connected to the system bus via an interface, such as a video adapter. In addition to the monitor, computers typically include other peripheral output devices, such as speakers or printers.

The above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

The invention claimed is:

1. A packaging machine (10), comprising:
a plurality of substantially parallel lanes (L) each for guiding articles (B) from an infeed end to an outfeed end thereof, said lanes (L) being defined with respect to one another by an inside lane guide (32) and an outside lane guide (33); and
a lane extension (70) telescopingly mounted at the outfeed end of each of said lanes (L), wherein each said lane extension (70) is selectively extendable and retractable to modify the length of said outside lane guide (33).

2. The packaging machine of claim 1, further comprising a pocket conveyor (20) for receiving articles (B) exiting said lanes (L);
wherein:
said articles (B) are deposited onto said pocket conveyor (20); and
each said lane extension is capable of extending above said pocket conveyor (20) such that the degree of extension of each said lane extension (70) controls the position at which said articles (B) are deposited.

3. The packaging machine of claim 2, wherein said pocket conveyor (20) travels in a direction of flow (F) and said lanes (L) are angled with respect to said direction of flow (F).

4. The packaging machine of claim 1, wherein each said lane extension (70) is independently extendable.

5. The packaging machine of claim 1, further comprising electromechanical means for automatically adjusting the extension of said lane extensions (70).

6. The packaging machine of claim 5, wherein all of said lane extensions (70) are synchronously extendable.

7. A method of arranging articles (B) on a conveyor (20) that drives the articles (B) in a direction of flow (F), comprising:

provide a plurality of substantially parallel lanes (L) each for guiding articles (B) from an infeed end to an outfeed end thereof, said lanes (L) being defined with respect to one another by an inside lane guide (32) and an outside lane guide (33), and said lanes (L) being angled with respect to said direction of flow (F);

for each of said lanes (L), selectively controlling the degree of extension over the conveyor (20) of a lane extension (70) that is telescopingly mounted at the outfeed end of said each of said lanes (L), thereby modifying the length of said outside lane guide (33); and wherein said degree of extension is selected according to the desired position of said articles (B) on said conveyor (20).

8. The method of claim 7, further comprising:

depositing said articles (B) on the conveyor (20) in a matrix-like arrangement having a plurality of rows each defined by articles (B) exiting a single lane; and selecting the degree of extension of each of said lanes (L) to control the distance between adjacent ones of said rows of articles (B).

9. The method of claim 7, further comprising selecting the degree of extension of each said lanes (L) according to the diameter of each of said articles (B).

* * * * *